United States Patent
Sharma et al.

(10) Patent No.: US 12,039,496 B2
(45) Date of Patent: Jul. 16, 2024

(54) TENANT DATA RESIDENCY REQUIREMENTS ENFORCEMENT IN MULTITENANT COLLABORATIVE WORK ENVIRONMENTS

(71) Applicants: Atlassian Pty Ltd., Sydney (AU); Atlassian Inc., San Francisco, CA (US)

(72) Inventors: Yash Sharma, Sydney (AU); Hideyoshi Cheong, Sydney (AU); Ievgen Aleinikov, Sydney (AU); Rohan Dhupelia, Sydney (AU); Steve Lee, Sydney (AU); Mike Dias, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 582 days.

(21) Appl. No.: 17/230,817

(22) Filed: Apr. 14, 2021

(65) Prior Publication Data

US 2022/0335384 A1    Oct. 20, 2022

(51) Int. Cl.
| | | |
|---|---|---|
| *G06F 16/2458* | (2019.01) | |
| *G06F 16/27* | (2019.01) | |
| *G06Q 10/10* | (2023.01) | |

(52) U.S. Cl.
CPC ....... *G06Q 10/103* (2013.01); *G06F 16/2471* (2019.01); *G06F 16/278* (2019.01)

(58) Field of Classification Search
CPC .. G06Q 10/103; G06F 16/2471; G06F 16/278
See application file for complete search history.

(56) References Cited

U.S. PATENT DOCUMENTS

| 2012/0144501 A1* | 6/2012 | Vangpat | H04L 63/108 |
| | | | 726/28 |
| 2020/0327140 A1* | 10/2020 | Khillar | G06F 16/2282 |

\* cited by examiner

*Primary Examiner* — Cam Y T Truong
(74) *Attorney, Agent, or Firm* — Brownstein Hyatt Farber Schreck, LLP (57) ABSTRACT

A multitenant collaboration tool is instantiated over physical infrastructure operated by a hosting platform. The multitenant collaboration tool leverages interfaces of the hosting platform to provision and/or instantiate buckets and/or data lakes in particular physical locations, serving from those data lakes tenant data required to be stored within those specified locations. The multitenant collaboration tool includes a multitenant query gateway configured to route data queries from client devices to appropriate multitenant data lakes associated with multitenant collaboration tool.

6 Claims, 5 Drawing Sheets

TENANT DATA RESIDENCY REQUIREMENTS ENFORCEMENT IN MULTITENANT COLLABORATIVE WORK ENVIRONMENTS

TECHNICAL FIELD

Embodiments described herein relate to multitenant services of collaborative work environments and, in particular, to systems and methods for enforcing tenant-specific data residency requirements.

BACKGROUND

An organization can establish a collaborative work environment by securing a tenancy of one or more multitenant cloud collaboration platforms, or collaboration services, to facilitate, for its employees, cooperation and completion of work related to common goals. For cost, efficiency, and reliability, multitenant cloud collaboration platforms are typically designed to store all data associated with the platform in a single, multitenant, data lake.

In such architectures, although tenant-specific data may be isolated from other tenants' data (and/or encrypted) to prevent inadvertent disclosure, all tenants' data is resident in the same physical storage, in the same physical location, which may be selected by, and/or controlled by, the provider of the multitenant cloud collaboration platform. As a result, it is often difficult or impossible for a tenant of a conventional multitenant cloud collaboration platform to certify (for clients or regulatory bodies) or guarantee that its data is physically resident—or is not physically resident—in a particular location or jurisdiction.

SUMMARY

Embodiments described herein take the form of a multitenant collaboration system including at least a host with a processor allocation executing: a multitenant collaboration tool (executing as a first instance) configured to provide server-side functionality for the multitenant collaboration tool; and a query gateway service executing (as a second instance) defining an interface to communicate with a client application configured to provide client-side functionality for the multitenant collaboration tool.

In these examples, the query gateway service is configured to receive a data request via the interface from a client device executing the client application and determine, based on the data request, a tenant identifier corresponding to a respective one tenant of the first instance, query gateway is further configured to: determine, based on the data request and the tenant identifier, an account identifier associated with a respective one cloud platform account associated with the first instance; determine, based on the account identifier and the data request, a data lake identifier, the data lake identifier associated with a respective one data lake of the respective one cloud platform account; submit a query from the second instance, based on the data request, to the respective one data lake; receive, from the respective one data lake at the second instance, a response to the query; and transmit the response from the second instance to the client application to cause the third instance to update a display of the client device based on the response.

Embodiments described herein take the form of a multitenant collaboration tool including at least a query gateway service defining an interface to communicate with a client application executing a client device, the query gateway service configured to: receive a data request via the interface from the client application; select from a database, an account identifier associated with a third-party hosting platform providing infrastructure for the multitenant collaboration tool; select a data lake associated with the account identifier based on the data request; obtain a data object from the selected data lake; and transmit the data object via the interface to the client application in response to the data request.

Additional embodiments described herein take the form of a method of scaling infrastructure supporting a multitenant collaboration tool, the method including at least: receiving a request to store a data object for a tenant of the multitenant collaboration tool; identifying an account associated with a hosting platform providing infrastructure for the multitenant collaboration tool; instantiating, via an interface of the hosting platform, a new data lake for the account of the third-party hosting platforming providing infrastructure for the multitenant collaboration tool; storing the data object in the new data lake; and storing in a database of a query gateway service an association between the data object and the new data lake.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

DETAILED DESCRIPTION

Embodiments described herein relate to systems and methods for managing data residency requirements for individual tenants of a multitenant service, such as a collaboration tool of a collaborative work environment.

As noted above, an organization can establish a collaborative work environment for its employees or customers by securing a tenancy—from a separate organization, referred to herein as a "provider"—of a more multitenant collaboration platforms. The tenancy can confer to the organization the ability to assign user accounts to its employees or customers in order to leverage one or more features of the multitenant collaboration platform. Example multitenant collaboration platforms include messaging systems, telephony systems, issue tracking systems, documentation systems, project management systems, databases, code repositories, and so on.

Conventional multitenant cloud collaboration platforms are typically designed by providers to operate over physical infrastructure provided by a third-party organization referred, to herein as a hosting platform. A hosting platform can provide compute and storage resources (as a service) to multitenant software service providers, who in turn leverage a provider-level account with the hosting platform to instantiate such resources at an appropriate level to meet their own clients' demand for the multitenant collaboration platform.

More simply, a hosting platform is engaged by a software provider to secure physical infrastructure over which the provider's multitenant collaboration platform may be instantiate. The software provider, in turn, is engaged by two or more organizations to secure tenancies of the provider's multitenant collaboration platform.

In the above-described conventional architecture, the provider typically instantiates with the hosting platform a single multitenant data lake (which may be sharded and/or geographically distributed in some examples) to store all data associated with the platform. Such an architecture reduces cost to the provider (by reducing the number of resources required of the hosting platform) and improves efficiency and reliability of the multitenant platform itself.

For example, in order to service requests for data for a particular tenant from the data lake, each data request may be tagged with a tenant identifier (and/or provided alongside tenant-specific credentials, for decryption purposes) so that the multitenant cloud collaboration platform can obtain the correct tenant-specific data from the centralized data lake.

In such architectures, although tenant-specific data may be isolated from other tenants' data and/or encrypted in order to prevent inadvertent disclosure, all tenants' data is resident in the same physical storage, in the same physical location(s), which may be selected by, and/or controlled by, the provider of the multitenant cloud collaboration platform.

For example, in some cases, a provider may periodically switch hosting platform vendors, in the process moving tenant from a first data lake instantiated over physical resources operated by a first hosting platform to a second data lake instantiated over physical resources operated by a second hosting platform.

As a result, it is often difficult or impossible for a tenant of a conventional multitenant cloud collaboration platform to certify, advertise, or guarantee for its clients, for its employees, or for regulatory bodies that its data is physically resident—or is not physically resident—in a particular location or jurisdiction.

Embodiments described herein provide systems and methods that can be leveraged by a provider of a multitenant collaboration platform to automatically instantiate, via a hosting platform interface (e.g., a hosting platform API) multitenant data lakes in specifically-requested regions, thereby ensuring that any request from any tenant of the multitenant collaboration platform to store data or data objects in a particular location can be efficiently serviced.

More specifically, embodiments described herein relate to multitenant services that include a multitenant query gateway interposing client-side and server-side functionality associated with various transactions and mutations of data objects of a particular multitenant platform.

In this manner, queries for data (or more particularly, for data objects) originating from client devices (client-side functionality) can be first received at the multitenant query gateway which, in turn, can determine where the requested data/data object is physically located. More specifically, the multitenant query gateway can be configured to determine which among a set of data lakes, each associated with a discrete and different physical region, realm, or location, stores the requested data.

Once such a determination has been made by the multitenant query gateway, the multitenant query gateway can forward the data request to the identified data lake (and/or a controller or manager thereof, providing server-side functionally) to retrieve the requested data object and return that data object to the client device/client application that originated the request.

In such examples, a data request received by a multitenant query gateway as described herein can include one or more identifiers that can assist the multitenant query gateway with one or more determinations of the subject data's location, namely a particular data lake in which the requested data is stored.

In other cases, the multitenant query gateway can be configured to hydrate the data request with one or more headers, identifiers, credentials, cryptographic tokens, and/or tags that enable downstream systems to determine where requested data is resident and how to query for the same.

For example, in some embodiments, a data request can be formatted as a structured object that includes one or more identifiers as attributes. One example structured object format is the JavaScript Object Notation format, or JSON. In such examples, a data request (as received by the multitenant query gateway and/or as hydrated by the multitenant query gateway) may follow the JSON format and may include one or more identifiers as noted above:

```
{
    "api" : "platform_1",
    "endpoint" : "/api/v2/get_user_profile_data",
    "user_id" : "user123",
    "tenant_id" : "tenant456",
    "residency_id" : "us-west",
}
```

The multitenant query gateway and/or one or more downstream services or systems may be configured to leverage these and/or other identifiers to locate the requested user profile data object.

For example, the multitenant query gateway of the preceding example may leverage a user identifier and a tenant identifier to select a particular data lake from which the requested data can be obtained. In another example, the multitenant query gateway can be configured to leverage a residency identifier to locate a particular data lake from which the requested data can be obtained.

These foregoing examples are not exhaustive; a person of skill in the art may readily appreciate that a number of different techniques can be used by a system as described herein to locate a particular data lake (among a set of data lakes, some of which may be monolithic, some of which may be sharded or geographically distributed) in order to service a particular data request received by a system as described herein.

More broadly, as may be appreciated by a person of skill in the art, a data lake as described herein is a single repository of structured or unstructured data that can store information from multiple sources. In many examples, a provider of a multitenant service may store data and/or data objects associated with, and/or owned by, multiple tenants in the same data lake. Such an architecture can dramatically simplify database management, software design, and can centralize security management for the provider of the multitenant service.

However, as noted above, some tenants may prefer or require that their data is physically stored within (or not within) a particular region, realm, or legal jurisdiction. For example, one tenant of a multitenant service may require that no customer data is stored in the United States, whereas another tenant may require that all data is stored in the United States but outside of California.

In other cases, a tenant may require a provider of a multitenant service to store that tenant's data within a country of the European Union. In yet another example, a tenant may require that the tenant's data and data objects are not stored in China. These foregoing examples are not exhaustive; it may be appreciated that generally and broadly, some tenants may prefer or require their data (or a subset thereof, such as data of particular clients or employees of that tenant) and data objects are stored in compliance with particular and specific data residency requirements.

Conventional multitenant software platforms and architectures are unable to provide such functionality, while maintaining efficient and cost-effective use of a hosting platform's infrastructure and resources.

Accordingly, embodiments described herein, as noted above, include the above-described multitenant query gateway. The multitenant query gateway serves as a data object request proxy that determines how to service individual calls for data and data objects (collectively, herein "data objects") in a multitenant platform.

Embodiments described herein also relate to how a multitenant query gateway can be leveraged to automatically horizontally scale physical infrastructure supporting a multitenant software platform to accommodate different tenant requests for different data residency requirements.

More specifically, in many embodiments, the multitenant query gateway can be communicably coupled to, and/or otherwise be configured to interface with, one or more account management interfaces of one or more hosting platforms providing physical infrastructure that supports a given multitenant software service. The hosting platform may first-party or may be third-party.

A hosting platform as described herein may provide on-demand, instantiable, or otherwise allocable bulk data storage (e.g., data lakes, databases, and so on) features, compute platforms and/or data analysis virtual machines, containers, or lambda functionality, or any other suitable processing allocation or memory allocation providing the physical compute and storage infrastructure over which a multitenant software service is instantiated, and operates.

For embodiments described herein, the multitenant query gateway can be configured to leverage host-level interfaces and APIs to dynamically instantiate any suitable number of data lakes in one or more host-level service accounts based on the requirements of individual tenants of a multitenant software platform. Further still, in some examples, the multitenant query gateway can be configured to monitor account-specific limitations, such as a maximum number of instantiable data lakes, and based on these limitations, instantiate and/or create additional accounts with the hosting platform in which additional data lakes can be instantiated.

As a result of the foregoing-described example methods of automatically horizontally scaling at either or both account level or data lake level, a system as described herein can organically grow to accommodate any new tenant and that tenant's specific data residency requests. More generally and broadly, as a result of the described systems and methods, a multitenant query gateway can selectively store particular data objects with particular residency.

For example, if a request is made from a tenant to store data with a residency for which a data lake does not already exist, the multitenant query gateway can leverage host-level interfaces to automatically instantiate a new data lake that satisfies the new data residency requirement. If such a request would violate one or more account-level rules enforced by the hosting platform, the multitenant query gateway can be configured to automatically create a new account with that hosting platform, and create a suitable new data lake within that account that satisfies the new data residency requirement. In this manner, any data object associated with any tenant of any multitenant software or platform can be stored with any arbitrary data residency requirements satisfied.

In another example, if a request is made from a tenant to store data with a residency for which a data lake does exist but is nearing and/or has exceeded its capacity, the multitenant query gateway can leverage host-level interfaces to automatically instantiate a new data lake that satisfies the same data residency requirement, resulting in two or more data lakes having the same residency.

In one example, a multitenant software platform engages a tenant that requires its data to be stored in a specific physical location. This preference/requirement can be stored in any suitable form or format in a database accessible to a multitenant query gateway, as described herein. In this example, a user account in the tenancy may create a new data object. In response, a request to store the data object may be received at the multitenant query gateway.

The multitenant query gateway can determine from the request (e.g., from the request source, request headers, request itself, and so on) which tenancy the data object is associated with and, with this information, the multitenant query gateway can access the database to determine tenant-level residency requirements of the data object.

In response, the multitenant query gateway may determine that the data object should be stored in a data lake physically located in the specified physical location. Thereafter, the multitenant query gateway determines whether such a data lake exists and if so, whether that data lake has capacity so support the request that the data object is stored therein. If a suitable data lake does not yet exist, the multitenant query gateway can cause the data lake to be instantiated (e.g., by communicating with a first-party or third-party hosting service over which the multitenant software platform is instantiated and operates), after which the data object can be stored therein.

Continuing the forgoing example, at a later time, the multitenant software platform may engage a second tenant that does not have any specific data residency requirements. As a result, data for the second tenant may be stored in any data lake, which may include the data lake referenced above.

Further continuing the forgoing example, at a later time, the multitenant software platform may engage third tenant that requires its data to be stored in a second physical location, different from the location required by the first tenant. As with the first tenant, the third tenant's preference/requirement can be stored in any suitable form or format in the database, accessible to a multitenant query gateway, as described herein. In this example, a user account in the third tenancy may create a new data object. In response, a request to store the data object may be received at the multitenant query gateway. The multitenant query gateway can determine from the request (e.g., from the request source, request headers, request itself, and so on) that the data object is associated with the third tenancy and, with this information, the multitenant query gateway can access the database to determine tenant-level residency requirements of the data object.

In response, the multitenant query gateway may determine that the data object should be stored in a data lake physically located in the second physical location. Thereafter, the multitenant query gateway determine whether such a data lake with appropriate capacity exists and if so, the data object can be stored therein. If a suitable data lake does not yet exist, the multitenant query gateway can cause the data lake to be instantiated (e.g., by communicating with a first-party or third-party hosting service over which the multitenant software platform is instantiated and operates), after which the data object can be stored therein and later accessed therefrom.

In some cases, as noted above, the multitenant query gateway can be configured to create, by communicating with a first-party or third-party hosting service over which the multitenant software platform is instantiated and operates, one or more host-level accounts upon determining that one or more required data lakes cannot be created within existing host-level accounts and limitations thereof.

These foregoing examples are not exhaustive of the various uses or constructions of a system as described herein. In particular, a system as described herein can implement tenant-level data residency requirements (e.g., all tenant data is stored in one or more particular locations), user-level data residency requirements (e.g., particular users' data is stored in particular locations), datatype residency requirements (e.g., personally identifying information can be stored in a particular location, whereas other data can be stored in a different location or may be location agnostic), and so on. Any suitable requirement can be fulfilled by a system as described herein.

In some cases, multiple residency rules can be interpreted by a multitenant query gateway as described herein; a particular data object request may invoke multiple data residency rules. For example, a particular data object request may be required to comply with a tenant-level residency rule that no tenant data can be stored in mainland China. In addition, the particular data object may also be required to comply with a user-level residency rule dictating that the data object must be stored in a physical location along the west coast of the United States. In this example, the multitenant query gateway can be configured to select a data lake within Oregon, thereby complying with both rules.

In some cases, the multitenant query gateway may determine that a particular data request cannot be serviced while complying with all applicable rules; in such examples, the multitenant query gateway can (1) create a suitable hosting platform account and/or data lake to service the request, (2) alert a network administrator (e.g., of a particular tenant, of the multitenant software platform, or any other suitable) that data cannot be store, (3) alert an end user or tenant representative that data cannot be stored in compliance with policy, or perform any other action or sequence of actions.

More broadly, a system as described herein provides residency-aware data storage to a single entity's (e.g., a business organization) content that may be created, and later accessed, when leveraging any number of software platforms, through each of which the entity owns a tenancy. In another phrasing, embodiments described herein relate to systems and methods for centrally, via a multitenant query gateway, controlling access to content stored within different multitenant data lakes associated with different residencies of different multitenant software platforms, (herein "software services" or "multitenant software services").

Herein, the phrase "tenant data" and/or "tenant data objects" may be used to refer to any and all content, data, metadata, or other information regardless of form or format that is authored, developed, created, or otherwise added by, edited by, or otherwise provided for the benefit of, a user of tenant of a multitenant software service.

Example tenant data can include personal data, private data, health information, personally-identifying information, business information, trade secret content, copyrighted content or information, restricted access information, research and development information, classified information, mutually-owned information (e.g., with a third party or government entity), or any other information, multimedia, or data.

In many examples, although not required, tenant data may include information that is classified in some manner, according to some procedure, protocol, or jurisdiction-specific regulation. In such embodiments, differently-classified data objects can be stored according to different data residency rules.

In many examples, tenant data can include logical objects defined by a particular multitenant platform. For example, a documentation service may define a page as an object; the page may be tenant data as used herein. In other examples, a paragraph of a page of a documentation service may be defined as a paragraph object, which may be tenant data distinct from its parent page. In such embodiments, different types of data objects can be stored according to different data residency rules.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform software service providers."

As known to a person of skill in the art, customers/clients of a multiplatform service provider are typically tenants of multiple platforms provided by a given multiplatform service provider. For example, a single organization (e.g., a client of a multiplatform service provider) may be a tenant of an email platform and, separately, a tenant of a calendaring platform.

The organization can create and/or purchase user accounts for its employees so that each employee has access to both email and calendaring functionality. In some cases, the organization may limit seats in each tenancy so that only certain users have access to email functionality and only certain users have access to calendaring functionality; the organization can exercise discretion as to which users have access to either or both tenancies.

As with other examples described herein, each of these different platforms may have different residency requirements and/or rules or policies that may be serviced by a multitenant query gateway as described herein. For example, email data residency rules may be different than calendar data residency requirements for a particular tenant. In other examples, executive email data residency may be different than general user data residency rules. These examples are not exhaustive.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service.

As with preceding examples, the organization can create and/or purchase user accounts for its employees, so that certain selected employees have access to one or more of issue tracking functionality, documentation functionality, and code repository functionality. Each of these different platforms may have different residency requirements and/or rules or policies that may be serviced by a multitenant query gateway as described herein. For example, as with other examples described herein, each platform may be associated with different rules and residency requirements.

These foregoing and other embodiments are discussed below with reference to FIGS. 1-5 However, those skilled in the art will readily appreciate that the detailed description given herein with respect to these figures is for explanation only and should not be construed as limiting.

Figure 1:
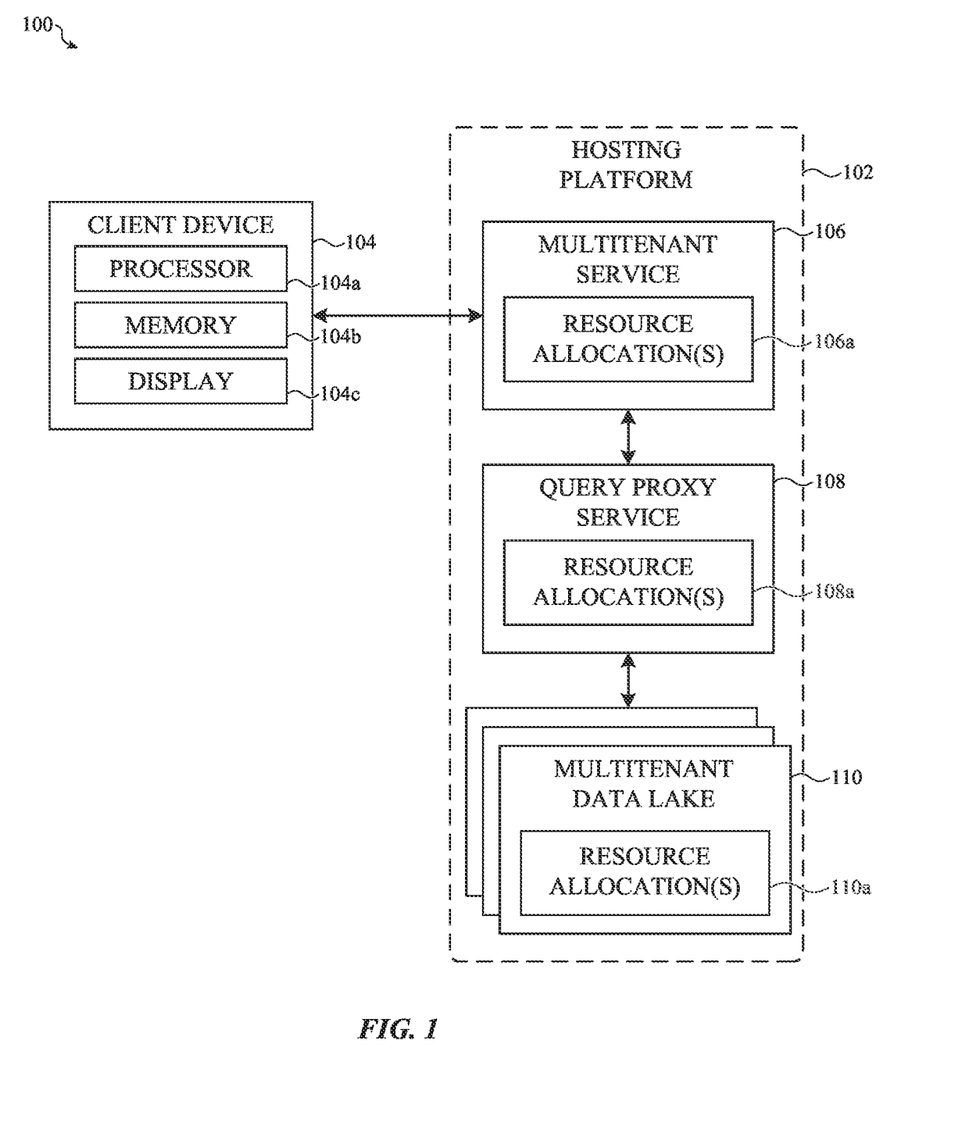
FIG. 1 depicts a simplified system diagram of a collaborative work environment, such as described herein.

FIG. 1 depicts a simplified system diagram of a collaborative work environment 100 leveraging a multitenant query proxy/gateway, such as described herein. For simplicity of illustration, the embodiments that follow reference an example construction in which an organization is a tenant of a single multitenant service that can be leveraged by employees of the organization to advance a common goal.

It may be appreciated that multitenant services are (e.g., platform as a service, software as a service, data as a service, and so on) are merely one example of software configurations that can leverage methods and systems described herein. In particular, it may be appreciated that licensed software, single-tenant software, and/or self-hosted software tools can likewise implement systems and methods, and leverage benefits therefrom, such as described herein.

Accordingly, because a person of skill in the art will readily appreciate how data lake management techniques described herein can be equivalently applied to many software systems and data architectures, examples that follow reference only multitenant system architectures (e.g., systems leveraging one or more multitenant services for collaboration purposes) for simplicity of description.

Example services that can be architected as multitenant services in which different tenants' content is isolated from one another while being physically stored in common multitenant data lakes may include, without limitation messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular multitenant service, including multimedia data such as images, audio files, or videos, can be considered user-generated, content as described herein.

In the illustrated example, the collaborative work environment 100—which is merely one example of an architecture such as described herein—includes a host platform 102 that communicably couples via one or more networking or wired or wireless communication protocols to a client device 104.

It may be appreciated that other client devices may be configured in a substantially similar manner as the client device 104, although this may not be required of all embodiments and different client devices can be configured differently and/or may transact data or information with, and/or provide input(s) to, the host platform 102 in a unique or device-specific manner. The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute one or more software applications (each referred to as "client applications") stored, at least in part, in the memory 104b. Each respective client application can be instantiated by the processor 104a. In particular, the processor 104a may access a persistent memory (e.g., of the memory 104b) to retrieve one or more executable binary files and/or other computer-executable instructions (collectively, "assets"). The processor 104a thereafter can load at least a portion of the retrieved assets into a working memory (e.g., of the memory 104b), thereby at least partially instantiating the respective client application. For simplicity of description an implementation in which the client device 104 is configured to execute/instantiate a single client application is described below.

In embodiments, the host platform 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like. The host platform 102 can be a third-party platform providing resources as a service or may be a first-party platform.

Specifically, it may be appreciated that although in some embodiments a host platform may be referred to as a singular "server", the host platform 102 may be a cluster of different computing resources, which may be geographically separated from one another. In this manner, generally and broadly, both the host platform 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host platform 102 and the client application supported/executed by the client device 104 are communicably coupled via a suitable network connection which may be wired, wireless, or a combination thereof. In some examples, the network connection may include the open Internet.

In other cases, the network connection coupling the host platform 102 and the client application may include only a private intranet managed by, or otherwise utilized by, an organization such as referenced above. The host platform 102 and the client application can communicate according to any suitable protocol, form, or format. In many examples, the host platform 102 is leveraged to instantiate a multitenant service 106, which at least partially exposes an API that can be accessed by the client application to perform one or more functions. For example, the client application may leverage the API to request tenant data (such as described herein) from the multitenant service 106 that is physically stored in a physical resource, such as a data lake, of the host platform 102.

For simplicity of description, the embodiments that follow reference a configuration in which the host platform 102 and the client application are configured to communicate and transact information according to a REST API, but it may be appreciated that this is merely one example and in other embodiments other signaling, communication, or data transaction methodologies may be used.

The host platform 102 of the collaborative work environment 100 can be configured and/or implemented in a number of suitable ways. For example, in many embodiments the host platform 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the host platform 102 or the multitenant service 106, such as a query proxy service 108.

The query proxy service 108 can be hosted by a virtual machine or container executing over physical or virtual resources of the host platform 102; collectively the physical and/or virtual resources allocated to instantiate the query proxy service 108 are identified in the figure as the resource allocation(s) 108a. As with other embodiments described herein, the resource allocation(s) 108a can include, but may not be limited to (or may not require) one or more of: a processor; a memory; non-volatile storage; networking connections; and the like.

For example, in many constructions, the query proxy service 108 is implemented in whole or in part as a software instance. The software instance defining the query proxy service 108 may be instantiated by a processor among the resource allocation(s) 108a. In particular, the processor may access a persistent memory to retrieve one or more executable assets. The processor thereafter can load at least a portion of the retrieved assets into a working memory, thereby at least partially instantiating the query proxy service 108 over physical resources provided by the host platform 102.

In some embodiments, the query proxy service 108 may be provided as a serverless function (e.g., a lambda function), may be provided as a reverse proxy, may be provided as a router or as any suitable software and/or hardware appliance configurable to communicably couple at least to the client device 104 and to service requests for information therefrom, such as requests for tenant data, such as described herein.

In other implementations, although not illustrated, the query proxy service 108 may be executed/instantiated separately from the host platform 102 altogether.

As noted with respect to other embodiments described herein, the query proxy service 108 can be configured to receive requests and serve responses specifically related to tenant data created within an environment defined at least in part by a multitenant software service, such as the multitenant service 106. Such requests for tenant data may include requests for data storage in particular regions, realms, or physical locations and/or residency validation and/or may automatically trigger one or more residency restriction compliance operations. In some cases, the query proxy service 108 may also be configured for authentication or authorization operations, but for simplicity of description the embodiments that follow reference only residency based decision-making.

An example multitenant service is a project management service. In this example, tenant data may be a task list attributed to, or otherwise associated with, a particular user of the project management service. At some instant, the user—having been previously authenticated by a service such as a single sign-on service or other credential verification service—may operate the client device 104 to initiate a request intended to be received by the project management service to retrieve the task list.

After the authenticated user of the client device 104 is determined to be authorized to view the task list, a copy of the task list can be transmitted via a suitable channel in a suitable format, via the query proxy service 108 to the client device 104 for rendering in a graphical user interface defined by the client application and displayed on the display 104c. More particularly, in this example, the query proxy service 108 interposes data stored by the project management service and the client application, routing authorized requests for tenant data (e.g., the task list) originating from the client application, to an appropriate multitenant data lake (e.g., selected from a set of multitenant data lakes 110, associated with and/or instantiated over the resource allocations 110a).

As understood by a person of skill in the art, as a part of servicing this request from the client device 104, the query proxy service 108 can determine whether the already-authenticated user currently using the client device has permission to access the requested tenant data, in this case, the task list. Separately and additionally, the query proxy service 108 can determine, based on the request itself, which among the set of multitenant data lakes 110 stores the requested data. For example, the query proxy service 108 can be configured to identify that a particular request for data includes a tenant identifier, a user identifier, and/or a residency identifier. In other cases, the query proxy service 108 can be configured to hydrate a request for data based on account information associated with a user of a particular tenancy. In either case, once the query proxy service 108 has determined what tenancy is associated with a particular request, the query proxy service 108 can determine which data lake stores the requested data and service the request for data from that identified data lake.

More specifically, the query proxy service 108 can be configured to maintain one or more internal databases to assist with determinations of the physical locations of individual data objects requested by the client device 104. In some cases, the query proxy service 108 can store one or more residency rules, documents, or residency-as-code files to define operations of the query proxy service 108.

The residency rules documents/code may be at least partially executable and/or readable by the query proxy service 108 which, in turn, can receive as input some identifier (herein a "user identifier") associated with the authenticated user, such as a user identifier, a user account identifier, and/or session identifier associated with the client device and so on. From this information, the query proxy service 108 can further identify a particular tenant identifier associated with a particular request and/or a particular residency identifier or data lake identifier associated with the request.

In addition, the query proxy service 108 can receive as input additional identifiers (herein, a "content identifier") associated with and/or identified the content being requested by the authenticated user, in this case, the task list. In other cases, a "feature identifier" may take the place of a "content identifier" herein, referring instead of content, to a feature or functionality of a software platform related to data, such as data analysis or statistical operations. As one example, a feature identifier may reference an ability of a messaging platform to send and/or receive a message.

In some cases, as noted above, the query proxy service 108 can be implemented as a distributed system, in which one or more partial or complete instances of at least a portion of the query proxy service 108 are instantiated in particular geographic locations and/or according to some desired parameter.

These foregoing embodiments depicted in FIG. 1 and the various alternatives thereof and variations thereto are presented, generally, for purposes of explanation, and to facilitate an understanding of various configurations and constructions of a multitenant query proxy/gateway, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that a query proxy service which may also be referred to as a multitenant query service, can be configured to service data requests for data stored in different multitenant data lakes associated with a multitenant environment a number of suitable ways.

In some cases, a query proxy service can leverage a cache or local database to locate data lakes that contain frequently-requested data objects. In other cases, a query proxy service can be configured to determine, given a particular data request, an associated tenant, an associated user, a relevant residency policy, and so on in order to determine a likely location of particular data.

In some cases, a query proxy service may construct multiple predictions and/or statistical likelihoods that particular requested data is actually contained within a particular data lake. In one embodiment, a query proxy service that receives a data object request from a client application can generate a list of likely data lakes in which the requested data object is stored. In some examples, the query proxy service can be configured to select a first likely data lake and if it is determined that the requested data is not stored in the first likely data lake, the query proxy service can advance to select a second likely data lake, iterating through the list of data lakes determined by the query proxy service. Upon determining a data lake suitable to service the request, the query proxy service can log an association between the data object, the user, and/or the tenant with the selected data lake so that subsequent requests can be serviced more expeditiously.

In addition, as referenced above, a query proxy service as described herein can be configured to leverage one or more interfaces provided by a hosting service over which the query proxy service operate. As a result of this connection, the query proxy service can automatically instantiate new data lakes in selected regions, realms, or locations on demand. In addition, the query proxy service can automatically create new hosting service accounts when data lake instantiation limits of other accounts is reached. In yet further examples, the query proxy service can be configured to automatically decommission and/or merge data lakes within the same region in order to horizontally contract.

The foregoing examples are not exhaustive. It may be appreciated that the embodiments described herein can be configured in a number of suitable ways to automatically create and manage multitenant data lakes in multiple discrete regions, thereby enabling tenants of associated multitenant platforms to specify where their data is physically stored.

In yet further examples, the systems and methods described herein can be combined with other database management techniques such as regional caching, edge caching, tiered caching/hierarchical caching, database sharding, and so on.

Figure 2:
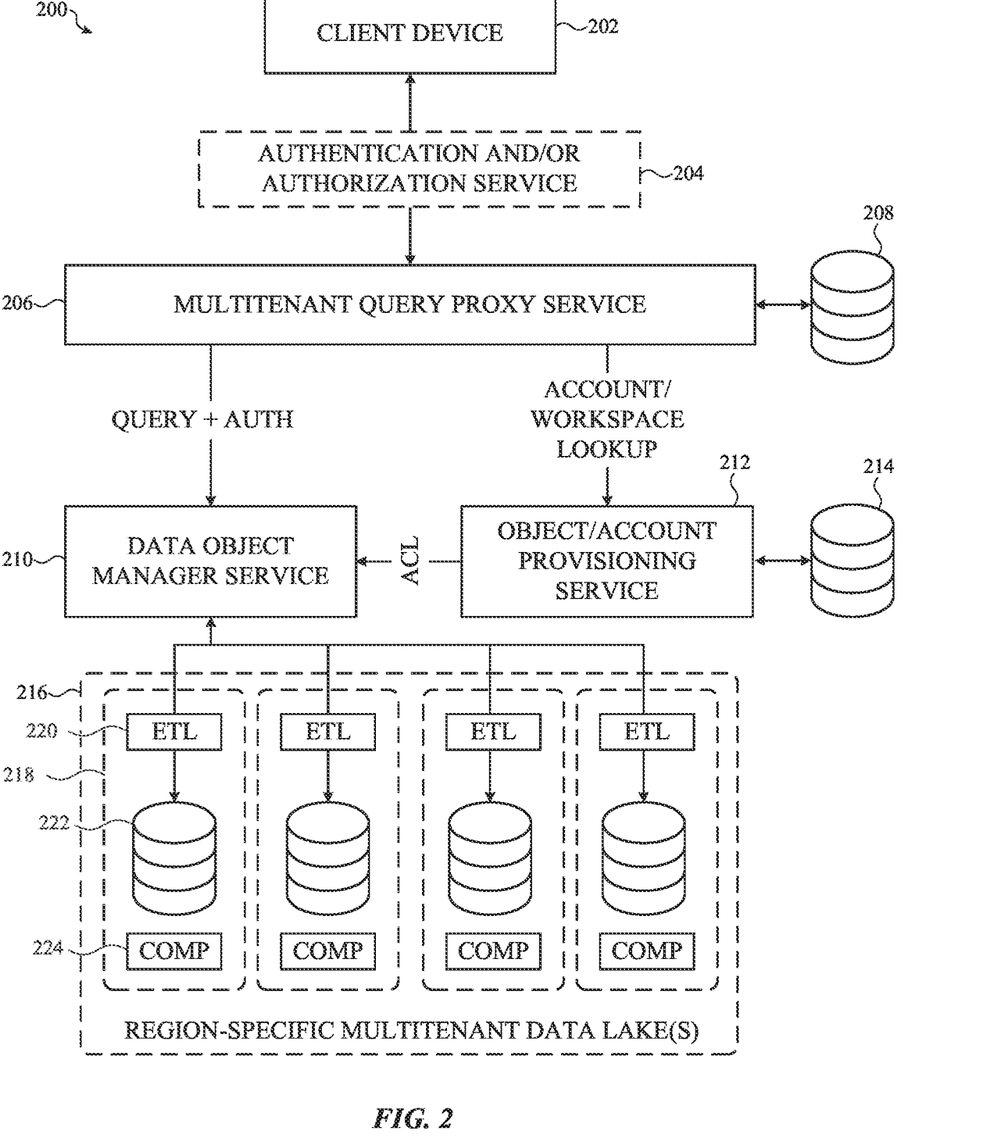
FIG. 2 depicts a simplified system diagram of a collaborative work environment including a multitenant query proxy service, such as described herein.

FIG. 2 depicts a simplified system diagram of a collaborative work environment including a multitenant query proxy service, such as described herein. The system 200 services requests from a client device that may be configured to execute one or more instances of one or more client applications, such as described above. The client device may be configured as described above with reference to the client device 104 of FIG. 1; this description is not repeated.

A client application instance (more simply, the "client application") executing on the client device 202 may be a native application, a browser application pointing to a particular address, or may any other suitable application or application or function wrapper. In the illustrated embodiment, the client application is identified as the client application executing as an instance of software over the client device 202. Regardless of the specific implementation of the client application executing as an instance of software over the client device 202, it is configured to communicably couple to a multitenant service. As one example, the client application executing as an instance of software over the client device 202 may be a local code repository management application and the multitenant service may be a code repository service.

In some embodiments, although not required of all implementations, the client application on the client device can be configured to authenticate a user thereof with a tenant-specific and/or multitenant authentication/authorization gateway service, identified in the figure as the authentication and/or authorization service 204. The authentication and/or authorization service 204 can be configured as a single sign-on service or any other suitable authentication service. The authentication and/or authorization service 204 is configured to authenticate and authorize requests from the client device 202 based on a user thereof; similarly, the authentication and/or authorization service 204 is configured to reject requests for data objects from the client device 202 that do not comply with authorization policies and/or requests for data objects that cannot be authenticated. A person of skill in the art will appreciate that the authentication and/or authorization service 204 can be implemented in many ways. For simplicity of description and illustration, the embodiments that follow reference data requests sent directly from the client device 202 to a multitenant query proxy service, such as described above. It may be appreciated however, that in some examples, the authentication and/or authorization service 204 interposes the client device and the multitenant query proxy service in order to provide authorization and/or authentication functionality to the system 200.

As noted above, the client application executing as an instance of software over the client device 202 is communicably coupled to a multitenant query proxy service 206 that, as with other embodiments described herein, can be communicably coupled to and/or associated with a local database 208. The local database 208 can serve as a request cache, a local cache, a lookup table, or any other suitable data store useful to the multitenant query proxy service 206.

The multitenant query proxy service 206 is in turn communicably coupled to a data object manager service 210 and a data object/account provisioning service 212.

The data object manager service 210 is configured to assist the multitenant query proxy service 206 in determining where a particular data object requested by the client device 202 is stored. In particular, the multitenant query proxy service 206 can be configured to communicate data requests received from the client device 202, along with any authentication information associated therewith (e.g., tenant credentials, user credentials, and so on) to the data object manager service 210. The data object manager service 210 can leverage this information to determine where the data referenced by the data request is stored.

As with other services described herein, the data object manager service 210 can be implemented as a single server or service or, in other cases, may be implemented as a distributed platform (having any suitable architecture and/or synchronization technique) in which two or more instances of a multitenant query proxy/gateway are instantiated. In many embodiments, the data object manager service 210 is instantiated as a portion of the multitenant query proxy service 206 itself, although this may not be required of all embodiments.

In some cases, different instances of the service can be instantiated in different geographic locations. In other cases, different instances can be instantiated in the same geographic location, and one may serve an overload protection and/or a load balancing purpose with respect to the other. For simplicity of description, a single instance is shown and labeled as the multitenant query proxy/gateway instance 210.

In addition, the system 200 includes the object/account provisioning service 212, which is communicably coupled to the data object manager service 210 and to the multitenant query proxy service 206. As with embodiments described above, the multitenant query proxy service 206 can be configured to leverage the object/account provisioning service 212 to determine hosting service accounts and/or tenant information associated with a particular data request by submitting lookup queries to the object/account provisioning service 212. In turn, the object/account provisioning service 212 can access a database 214 local or remote to the object/account provisioning service 212 to determine which tenants and/or which permissions policies are associated with (or implicated by) a particular request for data originating from the client device 202. Once such a determination is made, the object/account provisioning service 212 can forward one or more access control lists (labeled ACL in FIG. 2) to the data object manager service 210 such that the data object manager service 210 can determine whether to service the query received from the multitenant query proxy service 206 that originated from the client device 202.

Once the data object manager service 210 has received a particular request for data, and one or more other upstream systems (e.g., the authentication and/or authorization service 204, the multitenant query proxy service 206, and/or the object/account provisioning service 212) have confirmed that the request is from an authenticated and authorized user of the client device 202, the data object manager service 210 can determine which among a set of hosting platform accounts stores the requested data. Once an "account identifier" is determined, the account can be accessed to forward the data request to an appropriate data lake associated therewith. As with other embodiments described herein, the selected data lake may be associated with a particular region, realm (e.g., jurisdictionally or legally defined area), or other physical place.

More specifically, the data object manager service 210 can be configured to service the data request received from the client device 202 by selecting a particular bucket instantiated within the selected/associated hosting provider account. As maybe known to a person of skill in the art, an instance of a data lake in a hosting platform may be accompanied by certain computational resources in addition to raw data storage. Examples include an extract, transform, load module to assist with servicing data queries and a compute module for performing data analytics and/or optimizations and indexing. These examples of compute resources is not exhaustive; in other cases buckets may be instantiate with other resources or fewer resources.

Independent of a particular implementation, the data object manager service 210 may be configured to select—based on input from the object/account provisioning service 212 and/or the multitenant query proxy service 206—a particular bucket that includes and/or is associated with a data lake that stores the requested data.

In the illustrated example, a set of region-specific multitenant data lakes/buckets 216 is shown. For simplicity of illustration, a single bucket is identified as the bucket 218. The bucket 218 can include a dedicated ETL service 220 (e.g., extract, transform, load), a data lake 222, and/or a compute service 224. It may be appreciated that these allocations are not exhaustive of all embodiments.

The foregoing embodiments depicted in FIG. 2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
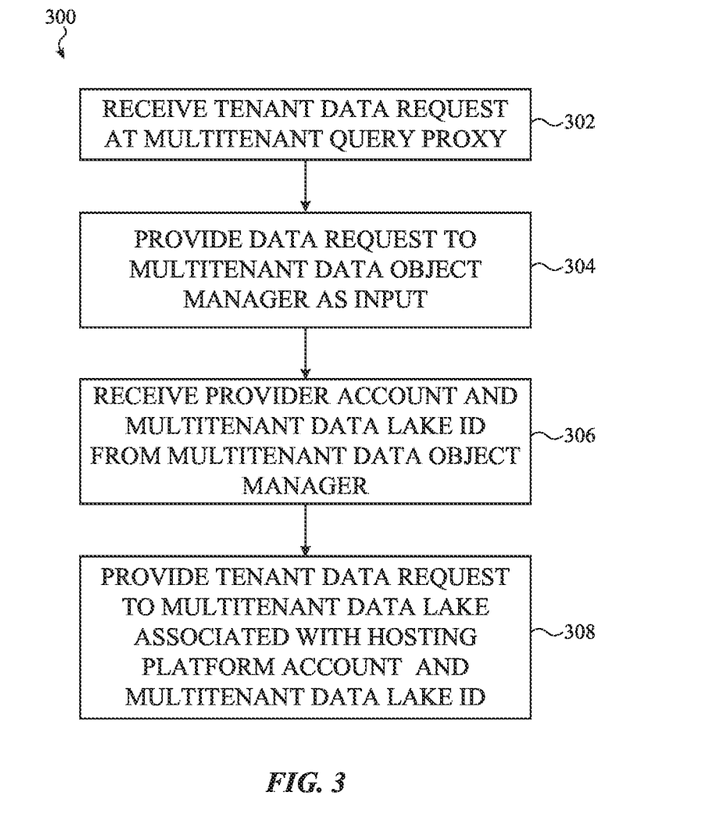
FIG. 3 is a flowchart depicting example operations of a method of serving tenant data, such as described herein.

FIG. 3 is a flowchart depicting example operations of a method of serving tenant data, such as described herein. The method 300 can be performed in whole or in part by any suitable service, implemented in whole or in part in software instantiated over physical hardware resident in any suitable jurisdiction. In some examples, the method 300 can be performed by a multitenant query gateway and/or a data object manager service as described herein.

The method 300 includes operation 302 at which a request for tenant data is received at a multitenant query gateway/proxy, as described above. As noted with respect to other embodiments described herein, the data request can include one or more identifiers, such as a user identifier (and/or any associated token or credential), a tenant identifier (and/or any associated token or credential), and/or a region identifier.

In other cases, the data request may not include certain identifiers. In such situations, the multitenant query gateway can be configured to hydrate the data request with supplemental information and/or identifiers. For example, the multitenant query gateway can be configured to leverage a data object manager service at operation 304 to determine a tenant identifier from a user identifier included with the data request. In another example, the multitenant query gateway can be configured to leverage an output of an object/account provisioning service to determine a data lake identifier and/or a region identifier from a user identifier or a tenant identifier.

In yet other examples, the multitenant query gateway can be configured to determine a particular hosting platform account identifier which, in turn, is associated with a particular data lake that stores the requested data at operation 306. In this manner, the multitenant query gateway can be configured as a request router and/or proxy; the multitenant query gateway is configured to determine a destination (e.g., a particular data lake of a particular host platform account) of a data request based on information stored in a database (e.g., a cache) local to or accessible to the multitenant query gateway and/or based on information contained in the data request itself.

For example, in one embodiment, a request for data is accompanied by one or more headers that include identifiers such as described above, such as a tenant identifier, an account identifier, a data lake identifier, and so on. Once a data lake identifier is obtained, the tenant data request received at operation 302 can be provided to the data lake at operation 308 to retrieve the requested data and return that data to the device that originated the request.

Figure 4:
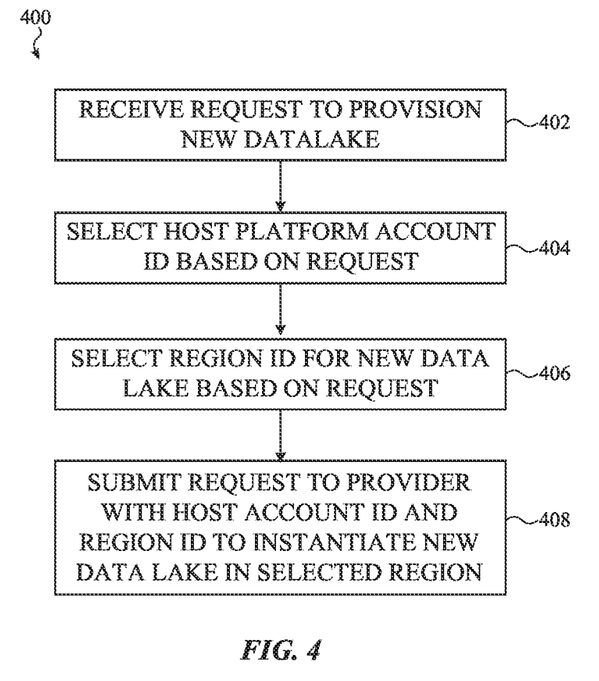
FIG. 4 is a flowchart depicting example operations of a method of horizontally scaling a system as described herein, such as described herein.

FIG. 4 is a flowchart depicting example operations of a method of horizontally scaling a system as described herein, such as described herein. As with method 300, the method 400 can be performed in whole or in part by any suitable service, implemented in whole or in part in software instantiated over physical hardware resident in any suitable jurisdiction. In some examples, the method 300 can be performed by a multitenant query gateway and/or a data object manager service as described herein.

The method 400 includes operation 402 at which a request to provision a new data lake is received. The request can be generated by and/or forwarded by a multitenant query gateway such as described above. In other examples the request can originate from an administrator of a system, such as described herein. In yet other examples, the request can originate from another source, such as an output of a process configured to detect whether a new data lake is required based on, for example, fullness of an existing data lake and/or the receipt of a request to store data in a particular region for which a data lake does not yet exist.

The method advances at operation 404 to select a hosting platform account into which a new data lake should be provisioned/instantiated. Next, at operation 406, a region identifier is selected for the new data lake, the region identifier based on the original request received at operation 402. The region identifier is associated with a particular region, realm, or physical location, such as described above. Thereafter, at operation 408 the method advance to submit a request to a hosting platform interface to create the data lake in the specified platform account.

Figure 5:
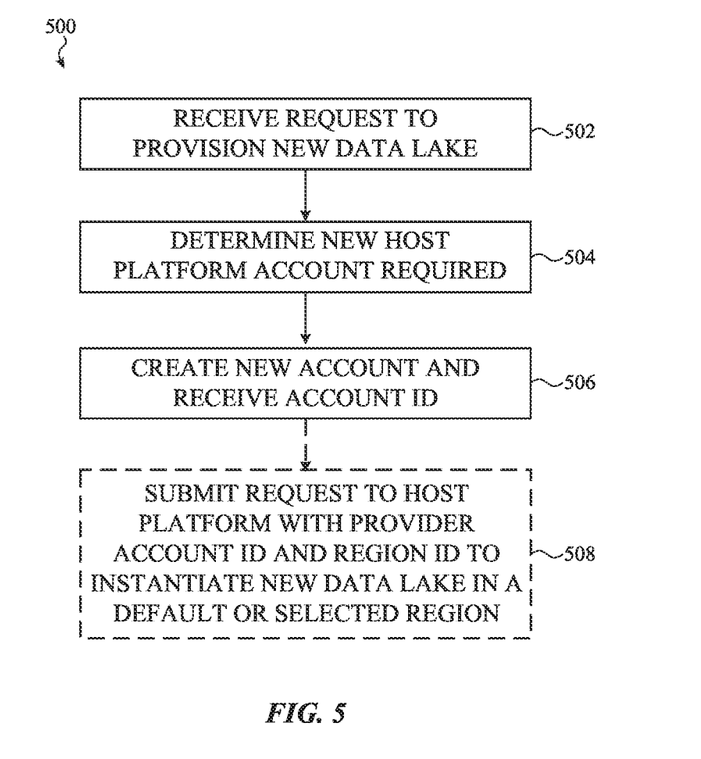
FIG. 5 is a flowchart depicting example operations of another method of horizontally scaling a system as described herein, such as described herein.

FIG. 5 is a flowchart depicting example operations of another method of horizontally scaling a system as described herein, such as described herein. As with other methods described herein, such as the methods 300,400, the method 500 can be performed in whole or in part by any suitable service, implemented in whole or in part in software instantiated over physical hardware resident in any suitable jurisdiction. In some examples, the method 300 can be performed by a multitenant query gateway and/or a data object manager service as described herein.

In this embodiment, the method 500 includes operation 502 at which a request is received to provision a new data lake. At operation 502, it may be determined that a new host platform is necessary (e.g., a data lake limit of an existing account has been reached). Accordingly, at operation 506, an interface of the host platform can be leveraged to create a new account and, optionally, thereafter at operation 508, a new data lake can be provisioned and/or instantiated therein.

In some cases provisioning of new accounts at a service provider level and/or provisioning new datalakes can be performed by a query gateway, as described herein. In other cases, such provisioning operations can be performed by a datalake itself or a separate, dedicated software service.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A multitenant collaboration system comprising:
a host comprising a processor allocation executing:
  a multitenant collaboration tool executing as a first instance configured to provide server-side functionality for the multitenant collaboration tool; and
  a query gateway service executing as a second instance defining an interface to communicate with a client application configured to provide client-side functionality for the multitenant collaboration tool, the query gateway service configured to:
  receive a data request via the interface from a client device executing the client application as a third instance, the data request formatted as a structured object comprising as attributes:
    a request for a data object stored by the multitenant collaboration tool;
    a tenant identifier;
    a user account identifier; and
    a region identifier;
  determine, based on the data request, that the tenant identifier corresponds to a respective one tenant of the first instance;
  determine, based on the data request, that the user account identifier is associated with a respective one cloud platform account of one or more host-level service accounts associated with the first instance;
  determine, based on the determined user account identifier, a data lake identifier and a respective one data lake, wherein the determined data lake identifier corresponds to the determined respective one data lake of a set of shared data lakes, wherein each shared data lake of the set of the shared data lakes associated with the respective one cloud platform account, and the region identifier identifying a physical location of the determined respective one data lake;
  submit a query from the second instance, based on the determined data lake identifier and the identified physical location, to the determined respective one data lake;
  receive, from the determined respective one data lake at the second instance, a response to the query, the response comprising the data object retrieved from the determined respective one data lake; and
  transmit the response from the second instance to the third instance to cause the third instance to update a display of the client device based on the response.

2. The multitenant collaboration system of claim 1, wherein the data request comprises the data lake identifier.

3. The multitenant collaboration system of claim 1, wherein the respective one data lake is selected from a set of data lakes associated with the respective one cloud platform account.

4. The multitenant collaboration system of claim 3, wherein the set of data lakes comprises a first data lake located in a first physical location and a second data lake located in a second physical location.

5. The multitenant collaboration system of claim 1, wherein the respective one data lake stores content for a plurality of tenants of the multitenant collaboration tool.

6. The multitenant collaboration system of claim 1, wherein the multitenant collaboration tool is one of:
an issue tracking system;
a documentation system; or
a project management system.

* * * * *